United States Patent
Wagner et al.

(10) Patent No.: US 10,675,662 B2
(45) Date of Patent: Jun. 9, 2020

(54) SCRAPER DEVICE FOR DISC ASSEMBLY

(71) Applicant: Kimberly-Clark Worldwide, Inc., Neenah, WI (US)

(72) Inventors: Jason L. Wagner, North Ogden, UT (US); Warren R. Harris, Plain City, UT (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 459 days.

(21) Appl. No.: 15/078,496

(22) Filed: Mar. 23, 2016

(65) Prior Publication Data
US 2017/0274424 A1 Sep. 28, 2017

(51) Int. Cl.
- B08B 1/00 (2006.01)
- B07B 1/52 (2006.01)
- B01D 33/46 (2006.01)

(52) U.S. Cl.
CPC ............ *B08B 1/005* (2013.01); *B01D 33/466* (2013.01); *B07B 1/526* (2013.01)

(58) Field of Classification Search
CPC ........ A47L 13/08; A47L 13/02; A47L 13/022; A47L 13/11; B08B 1/005; B08B 1/02; B07B 1/526; B07B 1/528; B07B 1/52; B65G 45/14; B65G 45/16; B65G 45/12; B01F 15/0487
USPC ... 15/256.5, 236.01, 236.05, 236.09, 236.06, 15/236.08, 236.5, 245, 245.1
See application file for complete search history.

(56) References Cited

U.S. PATENT DOCUMENTS

| | | | | |
|---|---|---|---|---|
| 2,817,862 A | * | 12/1957 | Frazho | A22C 17/08 15/3.17 |
| 2,833,443 A | | 5/1958 | Prickett et al. | |
| 5,007,523 A | * | 4/1991 | Morefield | B65G 45/16 15/256.5 |
| 5,072,687 A | | 12/1991 | Mitchell et al. | |
| 5,213,197 A | * | 5/1993 | Mohri | B65G 45/16 198/499 |
| 5,544,761 A | * | 8/1996 | Zdroik | B07B 1/15 209/618 |
| 5,762,712 A | | 6/1998 | Soehn | |

(Continued)

FOREIGN PATENT DOCUMENTS

| EP | 2 292 199 B1 | 10/2012 |
|---|---|---|
| GB | 0 311 672 A | 5/1929 |

(Continued)

*Primary Examiner* — Orlando E Aviles
*Assistant Examiner* — Aaron R McConnell
(74) *Attorney, Agent, or Firm* — Kimberly-Clark Worldwide, Inc.

(57) ABSTRACT

The present invention relates to a scraper device to assist with metering of material that may accumulate between the discs of a disc assembly. The scraper device includes a fixed mounting plate, a fixed retainer plate and a scraper material. The fixed retainer plate includes a shoulder. The scraper material includes an aperture through which the scraper material is removably fastened between the fixed mounting plate and the shoulder of the fixed retainer plate. The scraper device may further include a fastener to removably fasten the scraper material between the fixed mounting plate and the shoulder of the fixed retainer plate.

19 Claims, 5 Drawing Sheets

(56) References Cited

U.S. PATENT DOCUMENTS

| | | | | |
|---|---|---|---|---|
| 6,041,913 | A * | 3/2000 | Dolan | B65G 45/16 198/497 |
| 8,069,971 | B2 | 12/2011 | Swinderman et al. | |
| 2005/0120564 | A1 * | 6/2005 | Chen Lin | A47L 13/08 30/169 |
| 2006/0108202 | A1 * | 5/2006 | Swinderman | B65G 45/16 198/499 |
| 2013/0180991 | A1 * | 7/2013 | Williams | E05B 85/045 220/324 |
| 2015/0059117 | A1 * | 3/2015 | Kovacs | B65G 45/10 15/256.5 |
| 2016/0354810 | A1 * | 12/2016 | Zwerner | B08B 1/005 |

FOREIGN PATENT DOCUMENTS

| | | |
|---|---|---|
| GB | 0 512 660 A | 9/1939 |
| GB | 0 829 534 A | 3/1960 |
| JP | 11-180564 A | 7/1999 |
| JP | 5774357 B2 | 7/2015 |
| WO | WO 2012/084734 A1 | 6/2012 |
| WO | WO 2013/041228 A1 | 3/2013 |

* cited by examiner

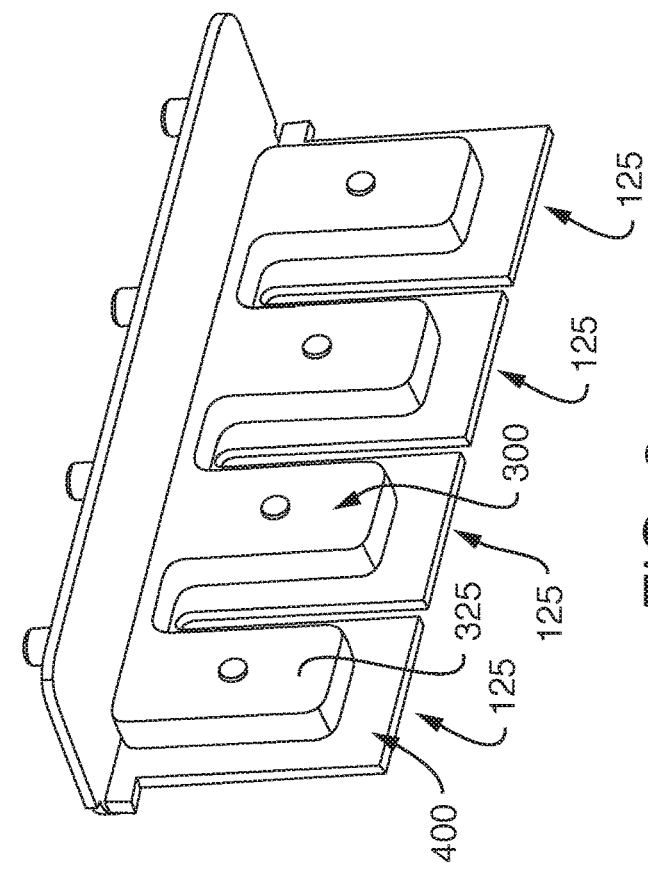
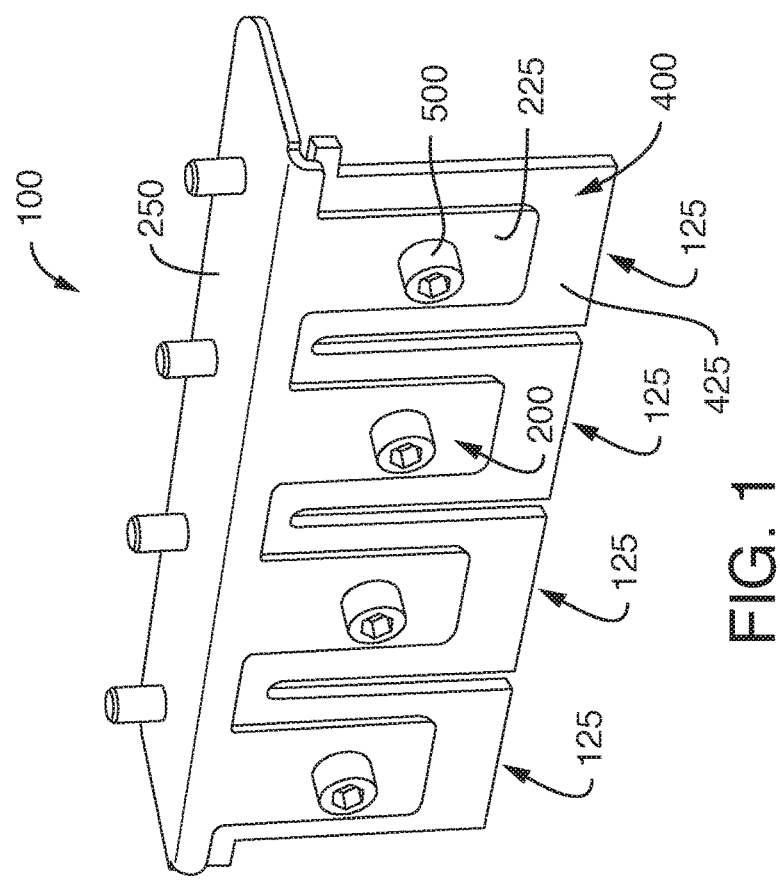

SCRAPER DEVICE FOR DISC ASSEMBLY

TECHNICAL FIELD

The present disclosure relates to a scraper device used to meter particulate or other material around the central shaft of a disc assembly. The scraper device includes a flexible scraper material that requires periodic replacement. The design of the construction between the scraper device and the disc assembly is such that the scraper material can be removed and replaced without the entire scraper device needing to be disengaged from the adjacent disc assembly support structure. Additionally, the scraper device is designed to enable self-adjustment of the scraper material between the individual discs of the disc assembly.

BACKGROUND OF THE DISCLOSURE

In the manufacture of products that include particulate materials, equipment and processes are needed to integrate the particulate material into the product. This need exists when the product exists in individual units at the point the particulate material is introduced into the product. The need also exists when the product exists in the form of a continuous chain of individual units at the point the particulate material is introduced into the product. Handling of particulate materials has challenges. Prior to being introduced into the finished product, the particulate material may be held in a device such as a vertical feeder hopper. In such a hopper, the particulate material may settle and the individual particles may aggregate and "clump" together. As the particulate material is being fed into the finished product, it needs to be fed in a way that the particles flow consistently and continuously into the finished product. If the feed process does not run in this manner, there may be undesirable consequences including clumping of the particulate material in the finished product-causing increased cost (more material added than needed) and less efficient product performance (particulate material is not placed where intended). In order to keep the particulate material feeding continuously into the finished product process, the particulate material may be fed through a device such as a disc assembly. Disc assemblies typically include a plurality of relatively thin, metal discs connected together at a rotating shaft. As the disc assembly operates, the particulate material may begin to accumulate and build-up on the rotating shaft. In order to prevent accumulation of the particulate material, scraper assemblies are utilized to meter particulate flow.

The scraper device is configured to work synergistically with the disc assembly. For example, a flexible material is positioned between each disc of the disc assembly to meter particulate material away from the disc assembly. The flexible material is typically rectangular in shape and acts as a flap that is in contact with the moving disc assembly. Over time and with continuous operation of the disc assembly, the flexible material gets worn and needs to be replaced with a regular cadence. With known scraper devices, the flexible material can be difficult and time-consuming to replace because of how the flexible material is attached to the mounting portion of the scraper device. Typically, the flexible material is attached in a way that requires the entire scraper device to be entirely or partially removed from its position in relation to the disc assembly. Removal of the scraper device from the manufacturing line is time-consuming and increases the potential for a safety event (because of the ergonomic postures that product manufacturing line technicians must take to do the job). When the new scraper material—which includes one or more flaps—is re-attached to the mounting device and the scraper device is ready to be re-installed in alignment with the disc assembly, significant time and troubleshooting is expended to properly align the flaps of scraper material between the discs. There is often an iterative trial and error process that occurs until the flaps are positioned to function properly while the disc assembly is operating.

There remains a need for a scraper device that is configured to simplify the replacement of the scraper material component. There remains a need for a scraper device that does not require dismounting from the adjacent disc assembly support structure to replace the scraper material. Further, there remains a need for a scraper device that self-adjusts to the inherent movement and motion of the disc assembly.

SUMMARY OF THE DISCLOSURE

The present disclosure is directed to a scraper device for a disc assembly. The scraper device includes a fixed mounting plate, a fixed retainer plate and a scraper material. The fixed retainer plate includes a shoulder. Further, the scraper material includes an aperture through which the scraper material is removably fastened between the fixed mounting plate and the shoulder of the fixed retainer plate. The shoulder of the fixed retainer plate is positioned within the aperture of the scraper material. With the scraper devices of the invention, the scraper material can be replaced without having to remove the fixed mounting plate from the surrounding structure supporting the disc assembly.

The present disclosure is also directed to a scraper device for a disc assembly including a fixed mounting plate, a fixed retainer plate and a scraper material. The fixed retainer plate includes a shoulder having a diameter. The scraper material has a height, a width and a thickness. The scraper material includes an aperture through which the scraper material is removably fastened between the fixed mounting plate and the shoulder of the fixed retainer plate. The aperture has a length across and in the direction of the width of the scraper material. The aperture also has a length along and in the direction of the height of the scraper material. The length of the aperture across the width of the scraper material is longer than the length of the aperture across the height of the scraper material. More specifically, the length of the aperture across the width of the scraper material may be from 1.5 to 2.0 times longer than the length of the aperture across the height of the scraper material. Further, the length of the aperture across the height of the scraper material may be from 1.04 to 1.10 times longer than the outer perimeter (e.g. diameter) of the shoulder of the fixed retainer plate.

The scraper devices of the invention may further include a fastener to removably fasten the scraper material between the fixed mounting plate and the shoulder of the fixed retainer plate. The shoulder of the fixed retainer plate may be circular, rectangular or any other shape suitable for performing the intended function. Further in relation to the discs of a disc assembly, the fixed mounting plate, the fixed retainer plate and the scraper material may form a unit that is configured to fit between two discs of a disc assembly. Alternatively, the scraper device of the invention may define a tab unit. The tab unit may include tab unit components of a panel of the fixed mounting plate, a panel of the fixed retainer plate and a panel of the scraper material. The tab unit may further include a fastener that removably fastens the tab unit components together. The scraper device may include one or more tab units as needed to engage appropriately with the disc assembly. In each instance of the scraper device of the invention, the scraper material may be formed of a material selected from a flexible thermoplastic material and a flexible polyurethane material.

These aspects and additional aspects of the invention will be described in greater detail herein. Further, it is to be understood that both the foregoing general description and the following detailed description are exemplary and are intended to provide further explanation of the invention claimed.

BRIEF DESCRIPTION OF DRAWINGS

FIG. 1 is a front perspective view of the scraper device of the invention.

FIG. 2 is a rear perspective view of the scraper device of the invention shown in FIG. 1.

DETAILED DESCRIPTION OF THE DISCLOSURE

Figure 6:
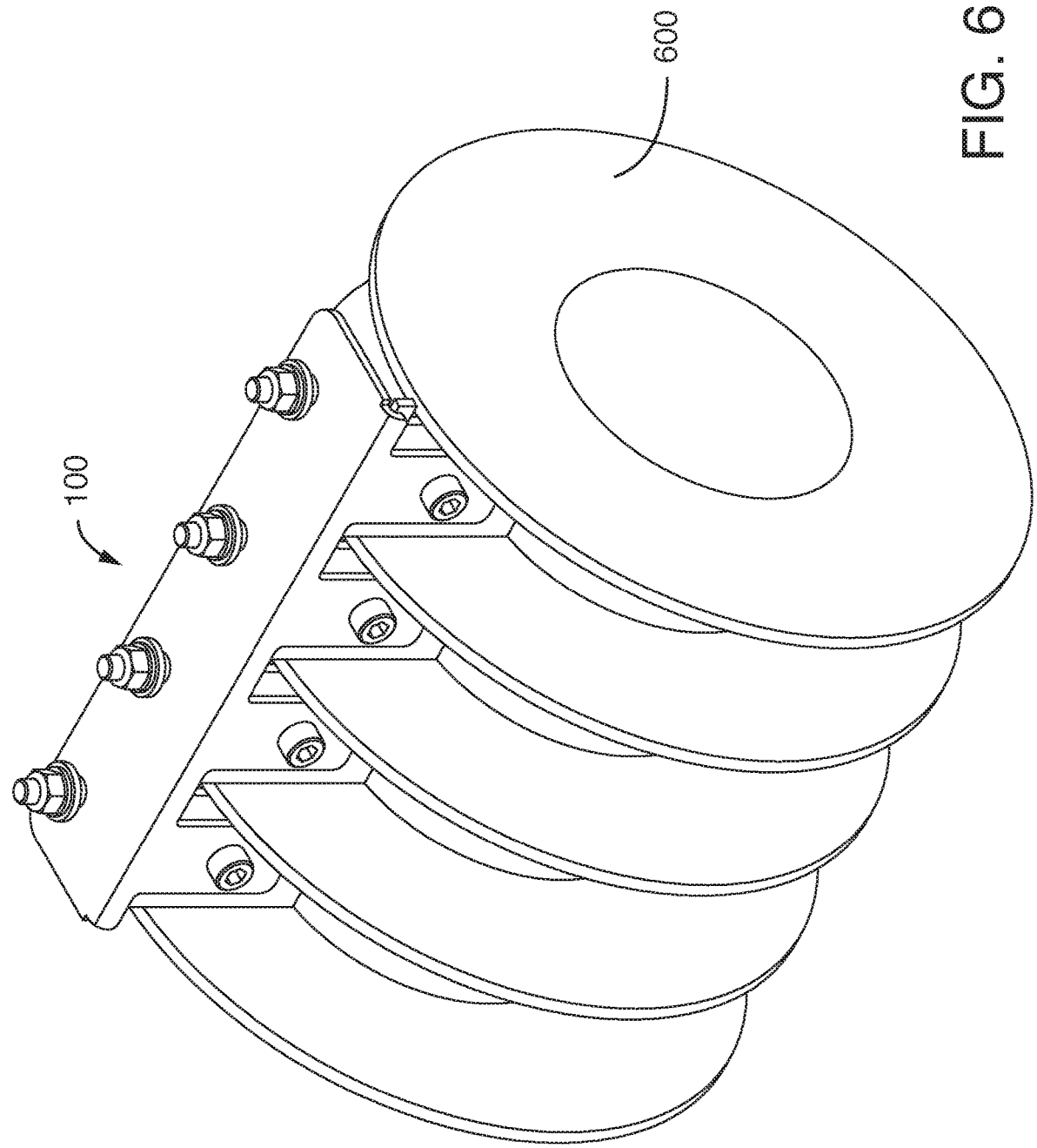
FIG. 6 is a perspective view of the scraper device of the invention in relation to a disc assembly as it would appear in use.

The present invention relates generally to a scraper device 100 for a disc assembly 600. The scraper device 100 is intended to meter material, such as particulate material, that may accumulate on or near the central shaft of the disc assembly 600. Disc assemblies 600 may be used to introduce the metered particulate or other raw material component in a manufacturing line for a finished product. Examples of finished products that may include a particulate component include disposable absorbent articles containing particulate superabsorbent material. The intended function of disposable absorbent articles is to capture and retain fluid and semi-fluid materials. Disposable absorbent articles include incontinence garments which have a complex, layered structure of nonwoven materials and superabsorbent. The superabsorbent component of incontinence garments is one of the most expensive components of the garment and therefore, the amount of superabsorbent in individual garments is typically well-controlled. During the manufacture of incontinence garments and other disposable absorbent articles, the superabsorbent is metered into the finished product manufacturing line from a material feeder, such as a vertical feeder. The vertical feeder may be associated with a disc assembly 600; the disc assembly 600 disrupts any aggregation or clumping of the superabsorbent that may form at the bottom of the vertical feeder. The disc assembly 600 helps to ensure a consistent metering of the superabsorbent into the finished product manufacturing line. The disc assembly 600 also helps to control the amount of superabsorbent introduced into individual garments or articles. Disc assemblies 600 typically include two or more discs that are interconnected by a central shaft. FIG. 6 shows a scraper device 100 of the invention in relation to a disc assembly 600 as will be described in further detail herein.

FIG. 1 shows a front perspective view of a scraper device 100 of the invention. The elements of the scraper device 100 visible in FIG. 1 include the fixed mounting plate 200, the scraper material 400 and the fastener 500. FIG. 2 shows a rear perspective view of the scraper device 100 shown in FIG. 1. The elements of the scraper device 100 visible in FIG. 2 include the fixed retainer plate 300. The scraper device 100 of FIGS. 1 and 2 includes four tab units 125. Each tab unit 125 includes the tab unit components of a panel of the fixed mounting plate 225, a panel of the scraper material 425 and a panel of the fixed retainer plate 325. The tab unit 125 further includes a fastener 500 that removably fastens the tab unit components together. The individual tab units 125 are configured to be located in between two discs of a disc assembly 600. As can be seen in FIGS. 1 and 2, the fixed mounting plate 200 includes the four panels 225 and a mounting surface 250 that connects the four panels 225 together across the top of the fixed mounting plate 200. The mounting surface 250 also functions as the connection structure between the scraper device 100 and the adjacent structure supporting the disc assembly 600. As shown in FIGS. 1 and 2, the fixed retainer plate 300 is fastened to the fixed mounting plate 200. The scraper material 400 does not touch the mounting surface 250 and, therefore, the scraper material 400 may be removed without removing the fixed mounting plate 200.

Figure 3:
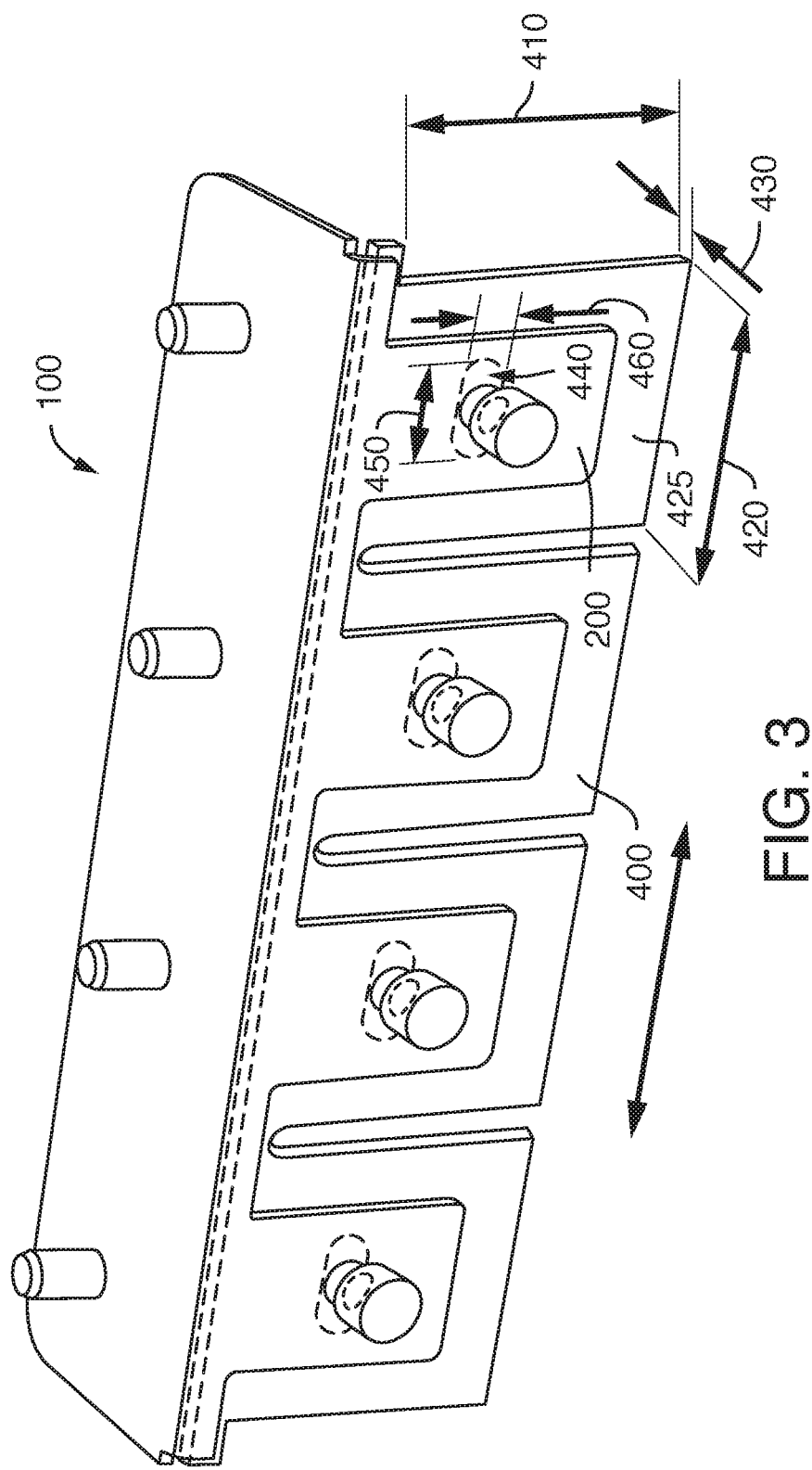
FIG. 3 is a front perspective view of the scraper device of the invention in which the portion of the scraper material behind the fixed retainer plate is shown in phantom.

FIG. 3 shows a front perspective view of the same scraper device 100 shown in FIGS. 1 and 2, but in FIG. 3, another aspect of the scraper material 400—that is behind the fixed mounting plate 200—is shown in phantom. Each panel of the scraper material 425 includes an aperture 440 (shown in phantom) through which the fastener 500 removably fastens the tab unit components. Each panel of the scraper material 425 has a height of the scraper material 410, a width of the scraper material 420 and a thickness of the scraper material 430. The aperture 440 has a length of the aperture across the width of the scraper material 450 and a length of the aperture across the height of the scraper material 460. The length of the aperture across the width of the scraper material 450 may be from 1.5 to 2.0 times greater than the length of the aperture across the height of the scraper material 460. Selection of the length of the aperture across the width of the scraper material 450 enables each panel of the scraper material 425 to self-adjust between the discs of a disc assembly 600.

Figure 4:
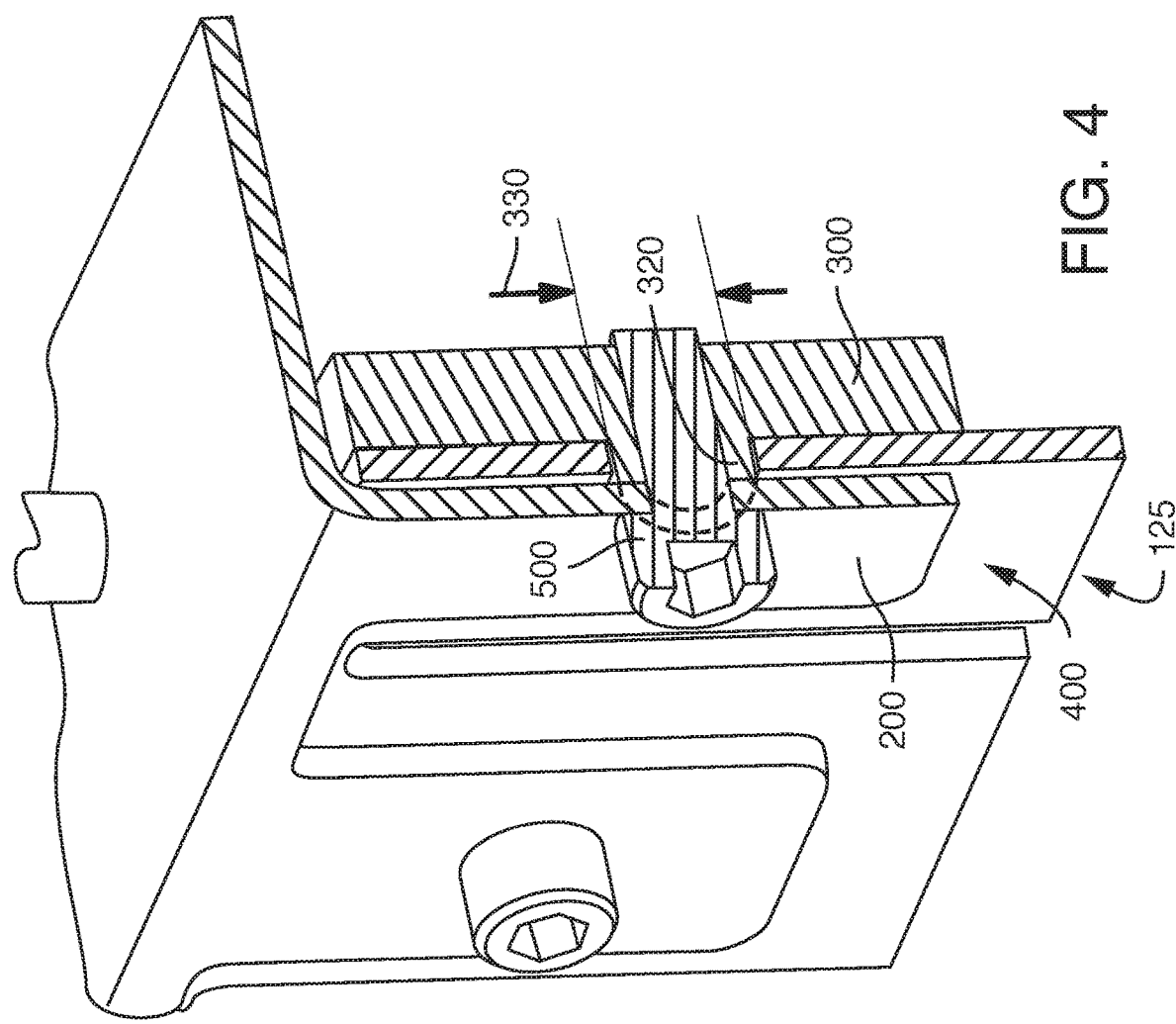
FIG. 4 is a perspective view showing a cross-section from the front to the rear of an individual tab unit of the scraper device of the invention.

FIG. 4 shows a perspective view of a cross-section of a tab unit 125 from the front through to the back. From the front moving toward the rear, the fixed mounting plate 200, the scraper material 400 and the fixed retainer plate 300 are shown. The fastener 500 runs through all three components of the scraper device 100 shown. From this cross-sectional view of FIG. 4, an important feature of the fixed retainer plate 300 is visible: the shoulder of the fixed retainer plate 320. The shoulder of the fixed retainer plate 320 is important because it prevents the scraper material 400 from being a fixed component and allows the scraper material 400 to float so that it can self-adjust in position between discs of the disc assembly 600. The shoulder of the fixed retainer plate 320 may be circular, rectangular or another shape through which a fastener 500 may pass and that keeps the scraper material 400 from being fixed. In FIG. 4, the shoulder of the fixed retainer plate 320 is circular, and it has a diameter 330. The diameter 330 of the shoulder of the fixed retainer plate 320 is less than the length of the aperture across the height of the scraper material 460. More specifically, the length of the aperture across the height of the scraper material 460 may be from 1.04 to 1.10 times longer than the diameter of the shoulder of the fixed retainer plate 330. When the shoulder of the fixed retainer plate 320 is rectangular or another shape, the height or length of the shape (that would be the same dimension as the diameter of a circular shape) is similarly less than the length of the aperture across the height of the scraper material 460.

Figure 5:
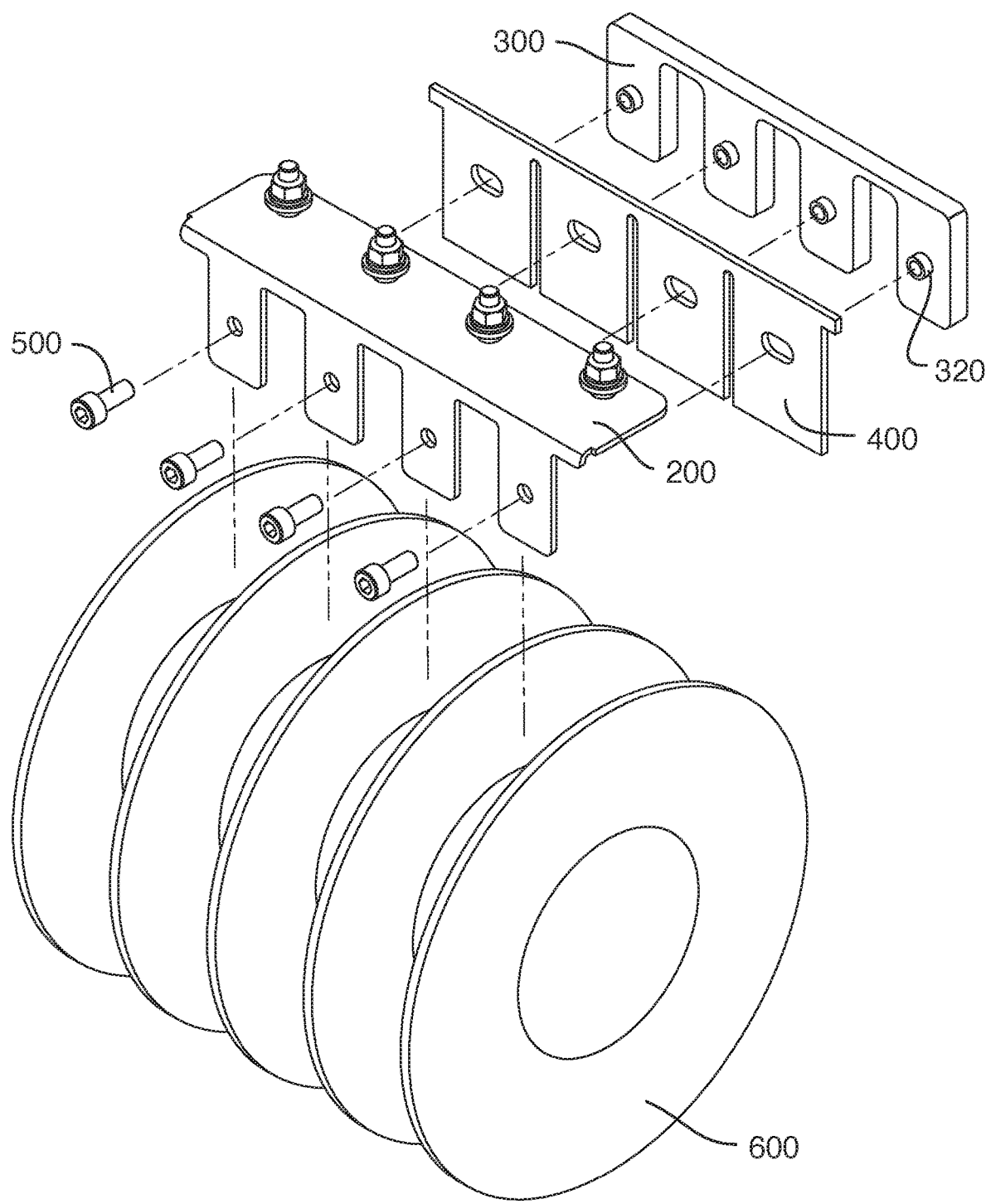
FIG. 5 is an exploded view of the scraper device of the invention in relation to a disc assembly.

As mentioned herein, an advantage of the scraper device 100 of the invention is that replacement of the scraper material 400 when it becomes worn is greatly simplified. With existing scraper devices, the entire scraper must be disengaged and separated from the disc assembly because the scraper material is attached underneath the equivalent of the fixed mounting plate and/or the equivalent of the mounting surface. When existing scraper devices are repositioned within a disc assembly, a trial and error process is required to ensure that the scraper material panels are precisely positioned between the discs. With the scraper device 100 of the invention, the combination of the shoulder of the fixed retainer plate 320 and the aperture 440 in the scraper material 400 enables the panels of scraper material 425 to float and to self-adjust between the discs of the disc assembly 600. FIG. 5 shows an exploded view of the scraper device 100 of the invention in relation to a disc assembly 600 and FIG. 6 shows a perspective view of the same scraper device 100 and disc assembly 600 as they would appear in use. The scraper device 100 shown in FIGS. 5 and 6 includes four tab units 125 that are positioned between five discs in use. FIG. 5 provides a clear illustration of how the tab unit 125 includes a fastener 500 and the tab unit components of a panel of the fixed mounting plate 225, a panel of the scraper material 425 and a panel of the fixed retainer plate 325. The shoulder of the fixed retainer plate 320 is also clearly shown. The fastener 500 may be a bolt or a screw or any other implement that can removably fasten the individual elements of the tab unit 125 together by positioning the aperture 440 around the shoulder of the fixed retainer plate 320.

While the devices of the invention have been described in detail with respect to specific aspects thereof, it will be appreciated that those skilled in the art, upon attaining an understanding of the foregoing, may readily conceive of alterations to, variations of and equivalents to these devices. Accordingly, the scope of the present invention should be assessed as that of the claims and any equivalents thereto.

What is claimed is:

1. A scraper device for a disc assembly, the scraper device comprising: (i) a fixed mounting plate comprising an aperture; (ii) a fixed retainer plate, wherein the fixed retainer plate includes a shoulder defining an aperture, the shoulder having a shoulder height defined as a distance the shoulder extends away from the fixed retainer plate; (iii) a unitary scraper material having a scraper material thickness and comprising a plurality of panels, each of the panels connected together by a base portion and separated by one or more slits extending in a height direction of the scraper material, wherein each of the panels of the plurality of panels of the scraper material includes an aperture through which the scraper material is removably fastened between the fixed mounting plate and the fixed retainer plate with the shoulder of the fixed retainer plate extending through one of the apertures of the scraper material, wherein the scraper material thickness is less than the shoulder thickness; and (iv) a fastener extending through an aperture of the fixed mounting plate, an aperture defined by the shoulder of the fixed retainer plate, and an aperture of one of the panels of the scraper material and securing the fixed mounting plate to the fixed retainer plate with the scraper material disposed between the fixed mounting plate and the fixed retainer plate such that the scraper material is moveable relative to the fixed mounting plate and the fixed retainer plate; wherein the fixed retainer plate further comprises a plurality of panels connected together by a base portion and separated by one or more slits extending in a height direction of the fixed retainer plate, the one or more slits of the fixed retainer plate overlapping with the one or more slits of the scraper material, when the fixed mounting plate is secured to the fixed retainer plate with the scraper material disposed between the fixed mounting plate and the fixed retainer plate.

2. The scraper device of claim 1, wherein the shoulder of the fixed retainer plate is circular.

3. The scraper device of claim 1, further comprising a disc assembly, the disc assembly having a central shaft and a plurality of discs extending radially outward from the central shaft and spaced from each other along the central shaft, and wherein each slit separating two adjacent panels of the scraper material is configured to receive one of the plurality of discs of the disc assembly.

4. The scraper device of claim 3, wherein the scraper material is in contact with the central shaft.

5. The scraper device of claim 4, wherein the scraper material is in contact with a plurality of the discs of the disc assembly.

6. The scraper device of claim 1, wherein the scraper device further defines a plurality of tab units wherein each tab unit includes tab unit components of a panel of the fixed mounting plate, a panel of the fixed retainer plate and a panel of the scraper material, each of the tab unit components comprising an aperture extending therethrough; the scraper device further including a fastener that removably fastens each of the tab unit components together, for each tab unit, such that the scraper material is moveable relative to the fixed mounting plate and the fixed retainer plate.

7. The scraper device of claim 1, wherein the apertures are located on the scraper material panels and not on the base portion.

8. The scraper device of claim 1, wherein the scraper material is formed of a material selected from a flexible thermoplastic material and a flexible polyurethane material.

9. The scraper device of claim 1, wherein when the fastener secures the fixed mounting plate to the fixed retainer plate with the scraper material disposed between the fixed mounting plate and the fixed retainer plate, the shoulder of the fixed retainer plate abuts the fixed mounting plate.

10. The scraper device of claim 9, wherein the movement of the scraper material relative to the fixed mounting plate and the fixed retainer plate is limited by the differences in size between the shoulder of the fixed retainer plate and the aperture defined in the scraper material.

11. The scraper device of claim 1, wherein the panels of the fixed mounting plate are spaced apart and connected to and project away from a base portion of the fixed mounting plate, and wherein the fixed mounting plate apertures are disposed on the panels of the fixed mounting plate.

12. A scraper device and a disc assembly, the disc assembly comprising: a central shaft; and a plurality of discs extending away from the central shaft and spaced apart long the shaft; and the scraper device comprising: (i) a fixed mounting plate comprising a plurality of panels separated by one or more slits extending in a height direction of the fixed mounting plate and connected by a mounting plate base portion; (ii) a fixed retainer plate coupled to the fixed mounting plate and comprising a plurality of panels separated by one or more slits extending in a height direction of the fixed retainer plate and connected by a retainer plate base portion, wherein a plurality of panels of the fixed retainer plate includes a shoulder having a diameter; and (iii) a unitary scraper material comprising a plurality of panels separated by one or more slits extending in a height direction of the scraper material and connected by a scraper material base portion, wherein the scraper material has a height, a width and a thickness; wherein each of the panels of the plurality of the panels of the scraper material includes an aperture through which the scraper material is removably fastened between the fixed mounting plate and the shoulder of the fixed retainer plate, the scraper material freely moveable relative to the fixed mounting plate and the fixed retainer plate when the scraper material is fastened between the fixed mount plate and the shoulder of the fixed retainer plate; and wherein a length of the aperture across the width of the scraper material is longer than a length of the aperture across the height of the scraper material, wherein a disc of the disc assembly is received in a slit of said one or more slits between the plurality of panels of the scraper material.

13. The scraper device of claim 12, wherein a length of the aperture across the width of the scraper material is longer than a length of the aperture across the height of the scraper material and wherein the length of the aperture across the width of the scraper material is from 1.5 to 2.0 times longer than the length of the aperture across the height of the scraper material.

14. The scraper device of claim 12, wherein a length of the aperture across the height of the scraper material is from 1.04 to 1.10 times longer than the diameter of the shoulder of the fixed retainer plate.

15. The scraper device of claim 12, wherein the shoulder of the fixed retainer plate abuts the fixed mounting plate when the scraper material is fastened between the fixed mounting plate and the fixed retainer plate.

16. The scraper device of claim 15, wherein the free movement of the scraper material relative to the fixed mounting plate and the fixed retainer plate when the scraper material is fastened between the fixed mounting plate and the fixed retainer plate is limited by the differences in size between the shoulder of the fixed retainer plate and the aperture defined in the scraper material.

17. The scraper device of claim 12, wherein slits of the fixed retainer plate with overlap slits of the fixed mounting plate and slits of the scraper material when the fixed retainer plate is secured to the fixed mounting plate with the scraper material disposed between the fixed retainer plate and the fixed mounting plate.

18. The scraper device of claim 12, wherein the shoulders of the fixed retainer plates and the apertures of the scraper material are disposed on panels of the fixed retainer plates and panels of the scraper material, and not on the base portions of the fixed retainer plates and base portions of scraper material, respectively.

19. The scraper device of claim 12, wherein the scraper material contacts the central shaft of the disc assembly.

* * * * *